United States Patent
Wendlandt

(10) Patent No.: US 7,358,519 B2
(45) Date of Patent: Apr. 15, 2008

(54) U-FLOW MULTICASSETTE AUTOLOADER FOR A STORAGE PHOSPHOR READER

(75) Inventor: William C. Wendlandt, Rush, NY (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 11/015,908

(22) Filed: Dec. 17, 2004

(65) Prior Publication Data

US 2006/0131526 A1    Jun. 22, 2006

(51) Int. Cl.
*B65H 5/00* (2006.01)

(52) U.S. Cl. ..................................... 250/589
(58) Field of Classification Search ................. 250/589
See application file for complete search history.

(56) References Cited

U.S. PATENT DOCUMENTS

| | | | |
|---|---|---|---|
| 4,893,011 A | 1/1990 | Bauer et al. | |
| 4,908,514 A | 3/1990 | Bauer et al. | |
| 5,324,957 A * | 6/1994 | Hejazi | 250/589 |
| 5,493,128 A | 2/1996 | Boutet | |
| 6,437,359 B1 | 8/2002 | Hall et al. | |
| 2004/0169152 A1 * | 9/2004 | Tsutoh et al. | 250/589 |

FOREIGN PATENT DOCUMENTS

| | | | |
|---|---|---|---|
| JP | 2004-264586 | | 9/2004 |
| JP | 02004264572 A | * | 9/2004 |

* cited by examiner

*Primary Examiner*—David Porta
*Assistant Examiner*—Marcus H Taningco

(57) ABSTRACT

A storage phosphor reader includes a multicassette autoloader for vertically oriented storage phosphor cassettes, the autoloader having a front, back, and opposite sides. The autoloader includes an input bin for receiving multiple vertically oriented storage phosphor cassettes stacked together in face-to-face contact such that the cassette faces face front and back; wherein each of the cassettes contains a storage phosphor which is removable from said cassette; an output bin located beside but spaced from the input bin; and a storage phosphor read location at which a storage phosphor is removed from and replaced in a cassette positioned at the storage phosphor read location; wherein the storage phosphor read location is located at the back of the autoloader and located in a path in line with the backs of the input bin and the output bin.

5 Claims, 5 Drawing Sheets

U-FLOW MULTICASSETTE AUTOLOADER FOR A STORAGE PHOSPHOR READER

FIELD OF THE INVENTION

The invention relates generally to the field of computed radiography, and in particular to a multi-cassette autoloader for a storage phosphor reader. More specifically, the invention relates to a multicassette autoloader which receives a stack of vertically oriented storage phosphor cassettes in face-to-face contact in an input bin, moves the cassettes serially in a U path from the input bin to a storage phosphor read location and then to an output bin for removal.

BACKGROUND OF THE INVENTION

Conventional film/screen radiography uses radiographic films which are not reusable. Computed radiography solves this problem by using reusable storage phosphors that can be exposed, read out, erased and reused many times. In order to protect the storage phosphor from damage during use, it is contained in a cassette from which it is removed during the reading and erasing process. One type of storage phosphor reader receives cassettes, one at a time, oriented horizontally. The cassette containing an exposed storage phosphor is presented to the reader horizontally, the storage phosphor is removed from the cassette and moved along a horizontal path, where it is read and then erased before the storage phosphor is replaced in its cassette. The cassette is then removed and a new cassette manually presented to the reader. In order to increase storage phosphor reader throughput and to relieve the reader user of sequentially loading and unloading storage phosphor cassettes, a multi-cassette autoloader was developed (See: U.S. Pat. No. 5,324,957, issued Jun. 28, 1994, inventor Hejazi). The autoloader disclosed in the latter patent is a separate piece of equipment from the storage phosphor reader and utilizes cog belts to index a plurality of horizontally oriented cassettes to a read site where the storage phosphors are removed from the cassettes and transported into and out of the storage phosphor reader. Because the cog belts are designed to accept only one size of cassette, the largest, and because many sized cassettes are used in the medical imaging field, pallets are used to handle smaller sized cassettes.

Although the latter autoloader is useful and successful for its intended purposes, it has certain drawbacks. Because the autoloader is a separate piece of equipment, substantial floor space is required to accommodate both the reader and the autoloader. Moreover, the use of pallets requires additional manual operations for the operator and creates storage problems when the pallets are not being utilized. A more compact storage phosphor reader is disclosed in U.S. Pat. No. 6,437,359 B1, issued Aug. 20, 2002, inventors Hall et al. As disclosed in the latter patent, the storage phosphor reader receives a storage phosphor cassette in a vertical orientation, removes the storage phosphor from the cassette, transports the storage phosphor along a vertical path where it is read and erased and replaces the storage phosphor in the cassette. An autoloader for such a vertically oriented storage phosphor reader is disclosed in U.S. Pat. No. 5,493,128, issued Feb. 20, 1996, inventor Boutet. The disclosed autoloader is combined with the storage phosphor reader resulting in the need for less floor space for the combined equipment. Moreover, the vertical autoloader automatically handles storage phosphor cassettes of varying sizes without the use of pallets. The vertical autoloader includes a cassette loading station and a cassette unloading station separated by a read site where an exposed storage phosphor is removed from and replaced in the storage phosphor cassette for vertical processing by the storage phosphor reader. Each of the cassette loading and cassette unloading stations includes a plurality of cassette locating slots defined by movable rear and bottom separators and indexers. The operator must load each cassette individually into a loading slot before the next cassette can be loaded. Moreover, the cassette must be loaded with the face oriented 90 degrees from the direction of loading in order to position it correctly into a cassette location slot.

Another generally vertically oriented storage phosphor reader is disclosed in U.S. Pat. No. 4,893,011, issued Jan. 9, 1990, inventors Bauer et al. The disclosed apparatus occupies a large floor area and is not provided with an autoloader to handle multiple cassettes of varying sizes. Moreover, the storage phosphor is removed from the cassette at one location and replaced in the cassette at another location resulting in inefficiencies.

While such systems may have achieved certain degrees of success in their particular applications, there is a need to provide an autoloader for vertically oriented storage phosphor cassettes of varying sizes which is easy to use, which allows the operator to load multiple cassettes at a time without regard to size and which is easily accessible.

SUMMARY OF THE INVENTION

According to the present invention, there is provided a solution to the problems and a fulfillment of the needs discussed above.

According to one aspect of the invention, there is provided a multicassette autoloader for vertically oriented storage phosphor cassettes, said autoloader having a front, back, and opposite sides, comprising:

an input bin for receiving multiple vertically oriented storage phosphor cassettes stacked together in face-to-face contact such that said cassette faces face front and back; wherein each of said cassettes contains a storage phosphor which is removable from said cassette;

an output bin located beside but spaced from said input bin; and a storage phosphor read location at which a storage phosphor is removed from and replaced in a cassette positioned at said storage phosphor read location; wherein said storage phosphor read location is located at the back of said autoloader and located in a path in line with the backs of said input bin and said output bin.

The invention has the following advantages:

1. An autoloader is provided for a storage phosphor reader which handles vertically oriented storage phosphor cassettes of varying sizes and which is located at the top of the reader, thus occupying the same footprint as the reader.

2. The autoloader is easy to use and easily accessible by an operator to load multiple cassettes at a time without regard to size and without the necessity of positioning individual cassettes in the autoloader.

BRIEF DESCRIPTION OF THE DRAWINGS

The foregoing and other features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
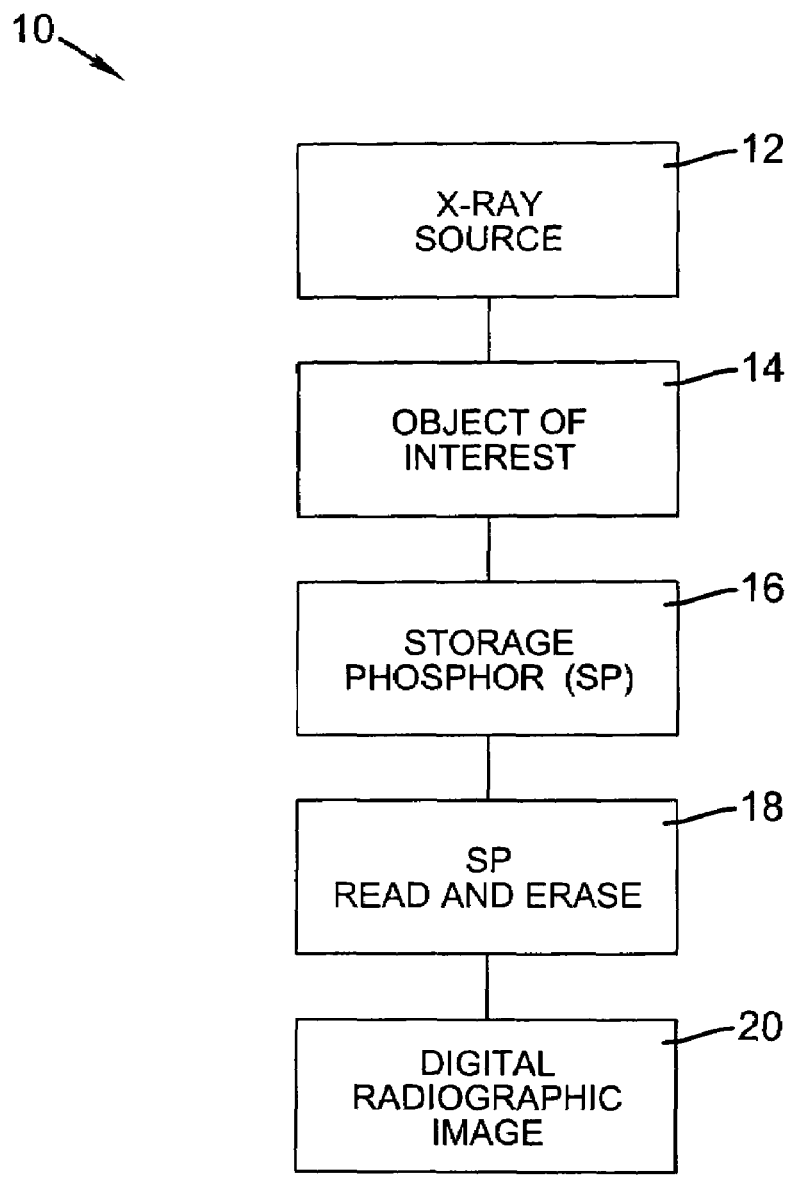
FIG. 1 is a block diagram showing a computed radiography system including the present invention.

The following is a detailed description of the preferred embodiments of the invention, reference being made to the drawings in which the same reference numerals identify the same elements of structure in each of the several figures.

The multicassette vertical autoloader of the present invention is used with a storage phosphor reader which is part of a computed radiography system. In general, computed radiography utilizes the principle that exposure of a storage phosphor to a radiographic image produces a corresponding latent image in the storage phosphor. If the storage phosphor is raster scanned (e.g., by means of a laser) in a storage phosphor reader with light of a first wavelength, the latent image will be emitted as a light image at a second wavelength. The emitted light image is converted into a digital image which can be processed, stored, displayed, and used to produce a hardcopy (film, paper) radiographic image.

FIG. 1 shows a generic computed radiography system 10. X-ray source 12 irradiates object of interest 14 (such as a body part) to produce a radiographic image which exposes storage phosphor (SP) 16. The latent radiographic image stored in storage phosphor 16 is read out in storage phosphor reader 18 as a digital radiographic image 20. The storage phosphor 16 is erased in SP reader 18 so that it can be reused. The digital radiographic image 20 can be processed to enhance the image, stored for later use, displayed on a display monitor for diagnostic purposes, transmitted to a remote location and/or used to produce a hard copy print (film or paper).

Figure 2:
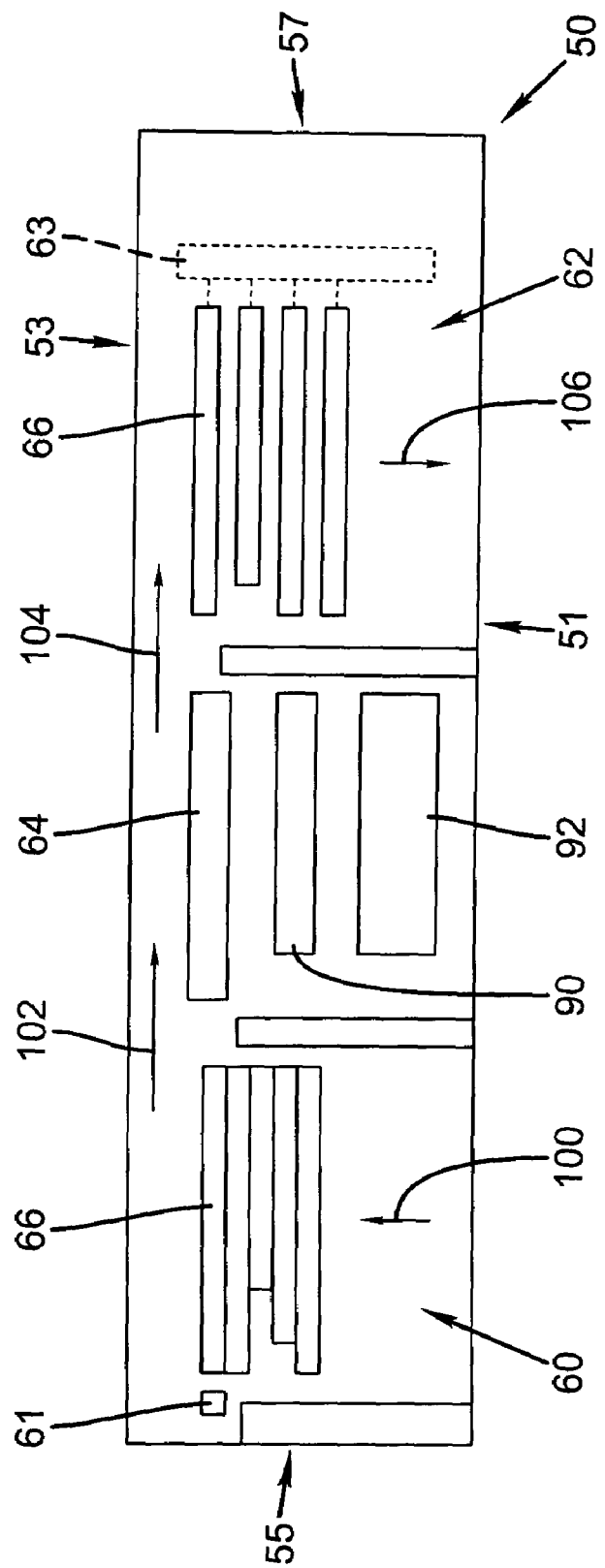
FIGS. 2 and 3 are respective top plan diagrammatic and left front perspective views showing a storage phosphor reader including the autoloader of the present invention.
Figure 3:
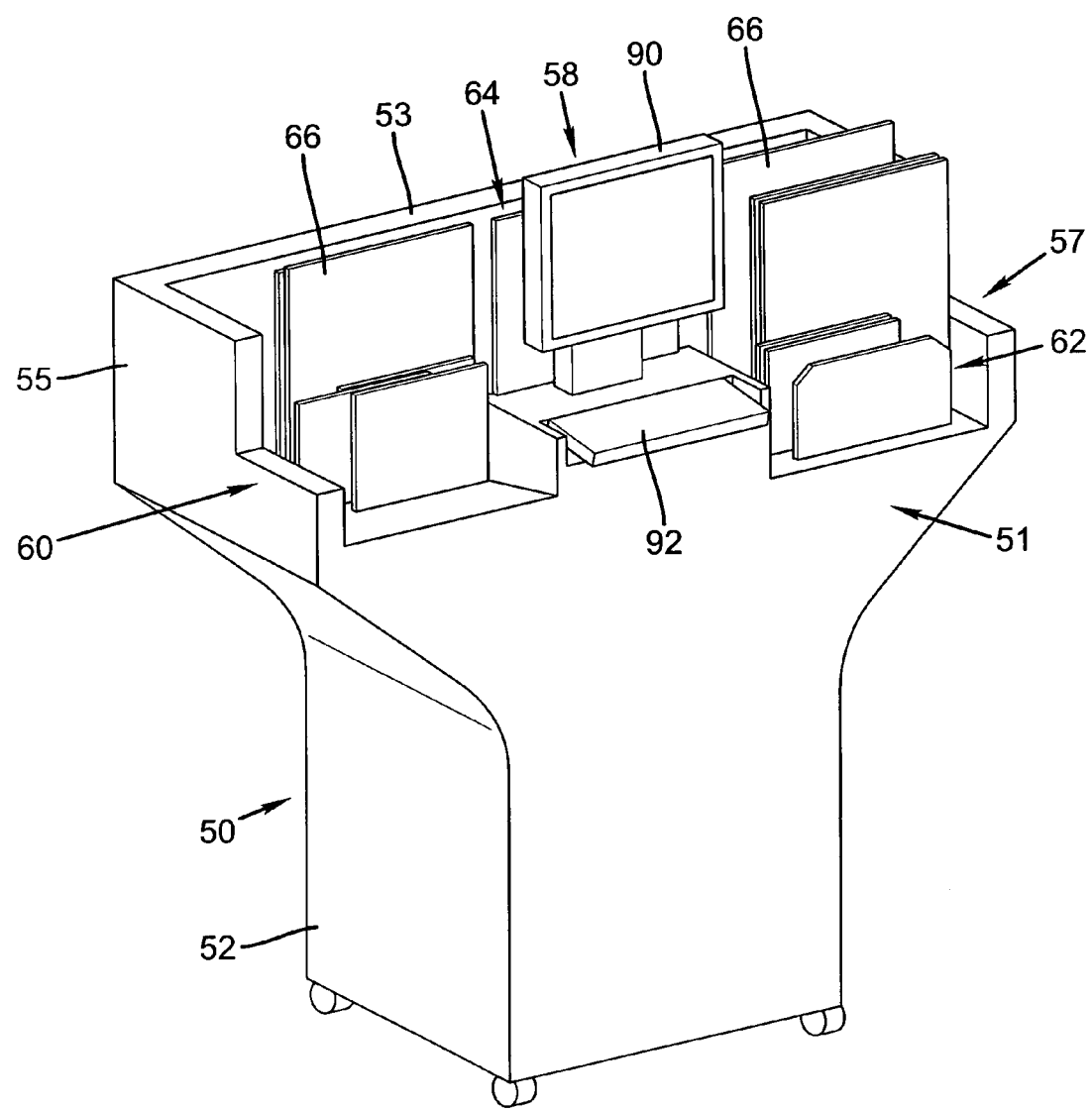

FIGS. 2 and 3 are respective top plan diagrammatic and left front perspective views of a storage phosphor reader including an embodiment of the multicassette vertical autoloader of the present invention. As shown, storage phosphor reader 50 includes a housing 52 for supporting the components of reader 50, such as read module 54 and erase module 56 (See FIG. 5}. Multicassette, vertical autoloader 58 is mounted on the top of and forms an integral part of reader 50 and thus occupies the same footprint as reader 50. Autoloader 58 includes a front 51, a back 53, and opposite sides 55 and 57. Autoloader 58 includes an input bin 60, an output bin 62 located beside but spaced from input bin 60, and a storage phosphor read location 64 located in the back 53 of autoloader 58 in between and in line with the backs of input bin 60 and output bin 62. Autoloader 58 is also provided with a display 90 and user interface 92.

One or more storage phosphor cassettes 66 (each of which contains a storage phosphor which is removable from cassette 66) are loaded as a stack into input bin 60 in face-to-face contact and in a direction such that the faces of said cassettes 66 face front-to-back. Preferably the bottom wall of input bin 60 is inclined to facilitate feeding of the cassettes through gravity. The leading cassette 66 in the stack of cassettes 66 is transported from input bin 60 to the storage phosphor read location 64 by a first cassette transport assembly 61 (such as a stripper, rollers, belts, or the like) that contacts the cassette and moves it linearly to read location 64. At read location 64, the storage phosphor contained in cassette 66 is removed from cassette 66 and transported vertically past read module 54 and erase module 56. The read and erased storage phosphor is then replaced in cassette 66. Assembly 61 then transports the read cassette from read location 64 to output bin 62. In output bin 62, a second cassette transport assembly 63 (such as a cog belt, rollers, belts or the like) transports the read storage phosphor cassettes to the front of autoloader 58 for subsequent removal. The U shaped path of cassettes 66 in autoloader 58 is depicted by arrows 100, 102, 104, and 106.

Figure 4:
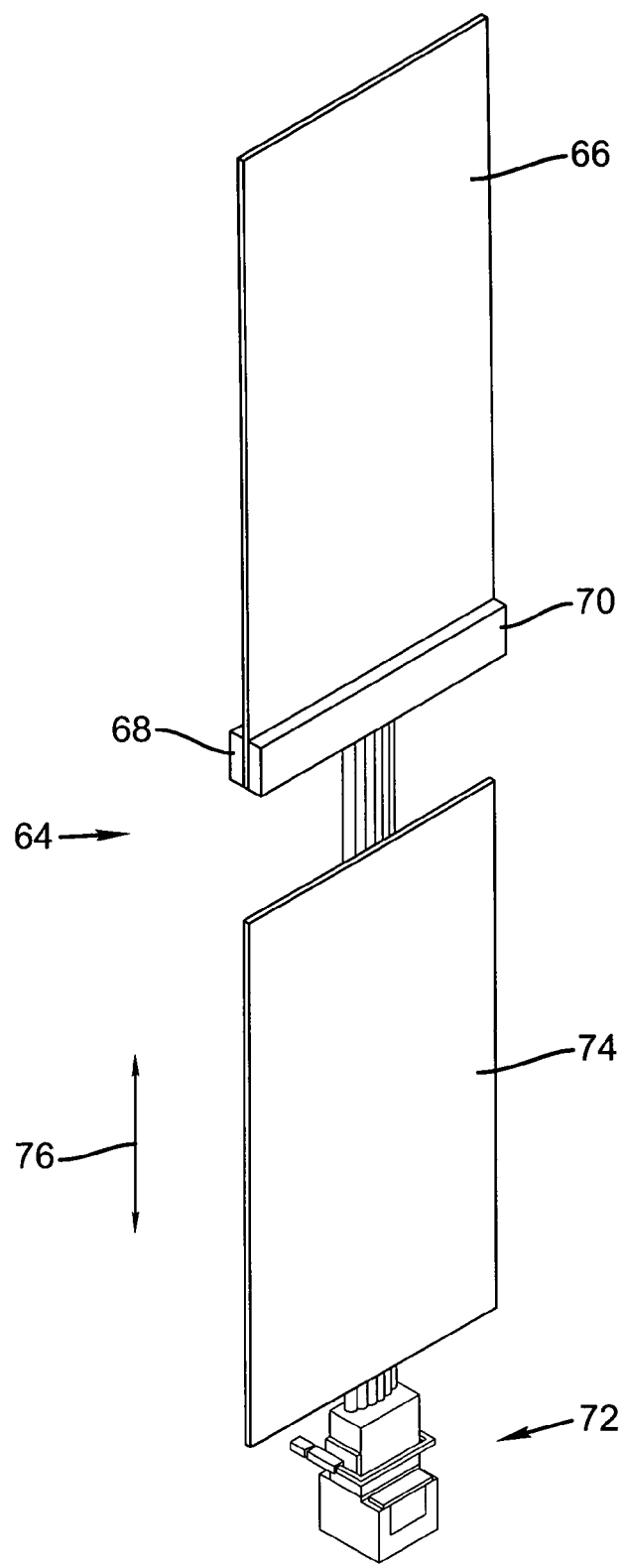
FIGS. 4 and 5 are respective front perspective and side elevational, diagrammatic views showing a vertical scanning assembly which can be incorporated in the storage phosphor reader shown in FIGS. 2 and 3.
Figure 5:
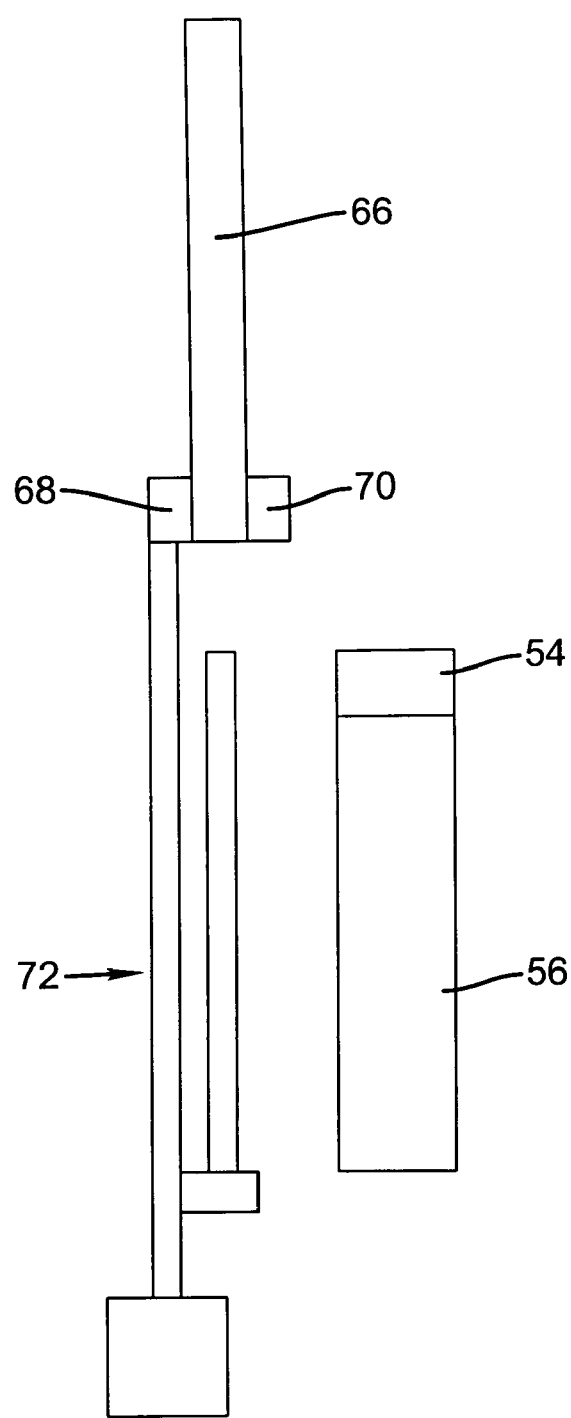

Referring now to FIGS. 4 and 5 there is shown an exemplary vertical assembly for transporting a storage phosphor from cassette 66, past read and erase modules 54, 56 and then back to cassette 66 (The assembly described in greater detail in U.S. Pat. No. 6,437,359 B1, issued Aug. 20, 2002, inventors Hall et al. can be used or any other suitable assembly). As shown, Storage phosphor cassette 66 is held at storage phosphor read location 64 of storage phosphor reader 50 by clamps 68 and 70. A storage phosphor transport assembly 72 removes storage phosphor 74 from cassette 66 and transports storage phosphor 74 vertically past read module 54 and erase module 56. Transport assembly 72 then transports storage phosphor 74 vertically to replace it in cassette 66. The vertical transport directions of storage phosphor 74 are represented by bidirectional arrow 76.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10—computed radiography system
12—X-ray source
14—object of interest (body part)
16—storage phosphor (SP)
18—storage phosphor reader
20—digital radiographic image
50—storage phosphor reader
51—front
52—housing
53—back
54—read module
55—side
56—erase module
57—side
58—vertical autoloader
60—input bin
61—first cassette transport assembly
62—output bin
63—second cassette transport assembly
64—storage phosphor read location
66—storage phosphor cassette
68, 70—clamps
72—storage phosphor transport assembly
74—storage phosphor
76—bidirectional arrow
90—display
92—user interface
100, 102, 104, 106—arrows

What is claimed is:

1. A multicassette autoloader for vertically oriented storage phosphor cassettes, said autoloader having a front, back, and opposite sides, comprising:
   an input bin for receiving multiple vertically oriented storage phosphor cassettes stacked together in face-to-face contact such that said cassette faces face front and back; wherein each of said cassettes contains a storage phosphor which is removable from said cassette;
   an output bin located beside but spaced from said input bin; and
   a storage phosphor read location at which a storage phosphor is removed from and replaced in a cassette positioned at said storage phosphor read location; wherein said storage phosphor read location is located at the back of said autoloader and located in a linear path in line with the backs of said input bin and said output bin, wherein said cassette is moved along a horizontally planar, U-shaped path in an ambient light environment from said input bin, to said storage phosphor read location, and to said output bin.

2. The autoloader of claim 1 including an assembly for transporting a storage phosphor cassette in a path from said input bin, to said storage phosphor read location, and then to said output bin for subsequent removal from said output bin.

3. The autoloader of claim 1 including a storage phosphor reader, wherein said autoloader is mounted on the top of said reader.

4. The autoloader of claim 3 wherein said autoloader is integral with said storage phosphor reader.

5. The autoloader of claim 3 wherein said storage phosphor reader includes a read module, an erase module, and a vertical assembly positioned at said read location below said read location for removing a storage phosphor from a cassette positioned at said read location, for transporting said removed storage phosphor past said read and erase modules, and for replacing said storage phosphor in said cassette.

* * * * *